United States Patent [19]

Farrell

[11] Patent Number: 4,524,249
[45] Date of Patent: Jun. 18, 1985

[54] KEYBOARD SWITCH ASSEMBLY

[75] Inventor: Charles F. Farrell, Attleboro, Mass.

[73] Assignee: Texas Instruments Incorporated, Dallas, Tex.

[21] Appl. No.: 616,363

[22] Filed: Jun. 1, 1984

[51] Int. Cl.³ ............................................ H01H 13/70
[52] U.S. Cl. ....................................... 200/5A; 200/306
[58] Field of Search ................. 200/5 A, 159 B, 86 R, 200/302.2, 306, 340

[56] References Cited

U.S. PATENT DOCUMENTS

| | | | |
|---|---|---|---|
| 3,676,607 | 7/1972 | Nash et al. | 200/5 A X |
| 3,760,137 | 9/1973 | Shimojo et al. | 200/5 A X |
| 3,879,586 | 4/1975 | DuRocher et al. | 200/5 A |
| 3,898,421 | 8/1975 | Suzumura | 200/5 A X |
| 3,932,722 | 1/1976 | Obata et al. | 200/5 A X |
| 3,978,297 | 8/1976 | Lynn et al. | 200/302.2 X |
| 3,996,430 | 12/1976 | Eberwein et al. | 200/5 A |
| 4,018,999 | 4/1977 | Robinson et al. | 200/5 A |
| 4,072,004 | 2/1978 | Tanaka et al. | 200/5 A X |
| 4,156,802 | 5/1979 | Gilano et al. | 200/5 A |
| 4,291,201 | 9/1981 | Johnson et al. | 200/5 A X |
| 4,363,942 | 12/1982 | Deeg et al. | 200/5 A X |
| 4,367,384 | 1/1983 | Waarle' | 200/340 X |

Primary Examiner—J. R. Scott
Attorney, Agent, or Firm—John A. Haug; James P. McAndrews; Melvin Sharp

[57] ABSTRACT

A keyboard assembly is shown utilizing a keypad formed from a sheet of soft rubber having a plurality of dome shaped portions. A conductive layer is disposed on the bottom surface of each dome shaped portion and is aligned with spaced interdigited conductive runs on a substrate at a switching station and is adapted to move into and out of bridging electrical contact with the spaced interdigitated runs. The keypad is compressed around the switching stations to form an environmental seal by ribs formed on an escutcheon and held there by posts projecting from the escutcheon through the keypad and substrate and deformed against the substrate. The substrate may be a flexible membrane supported by a rigid plate or it may be a circuit board type member. The dome shaped portions are integrally vented by a channel formed in the keypad extending between the dome shaped portions.

13 Claims, 11 Drawing Figures

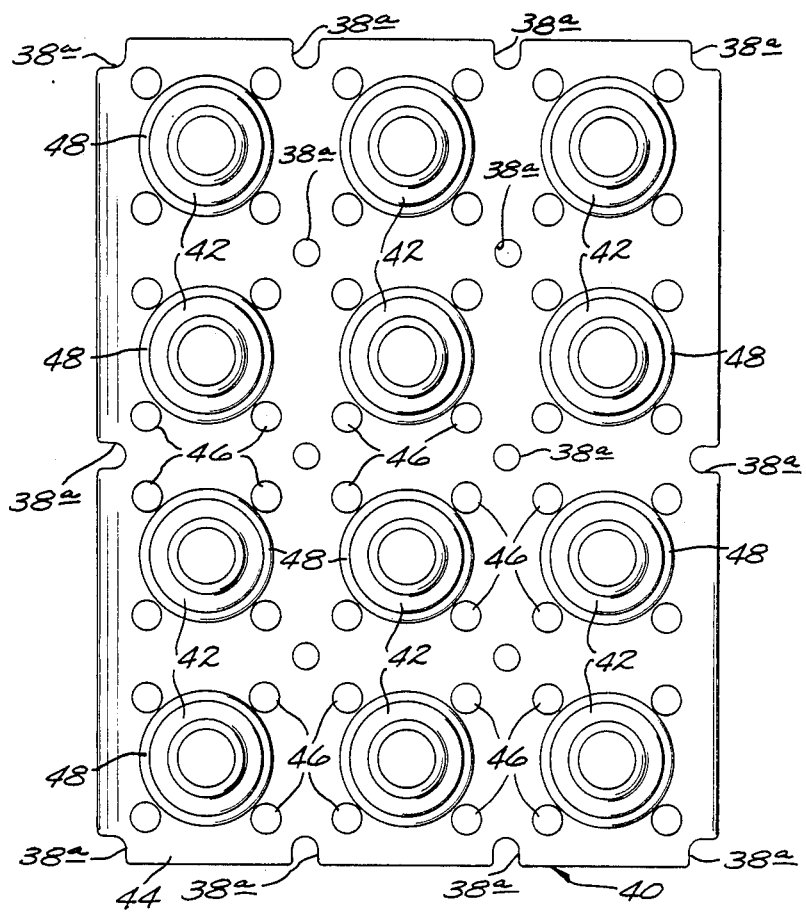
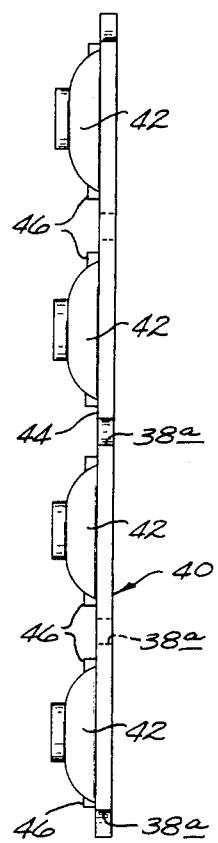
Fig. 6.    Fig. 7.
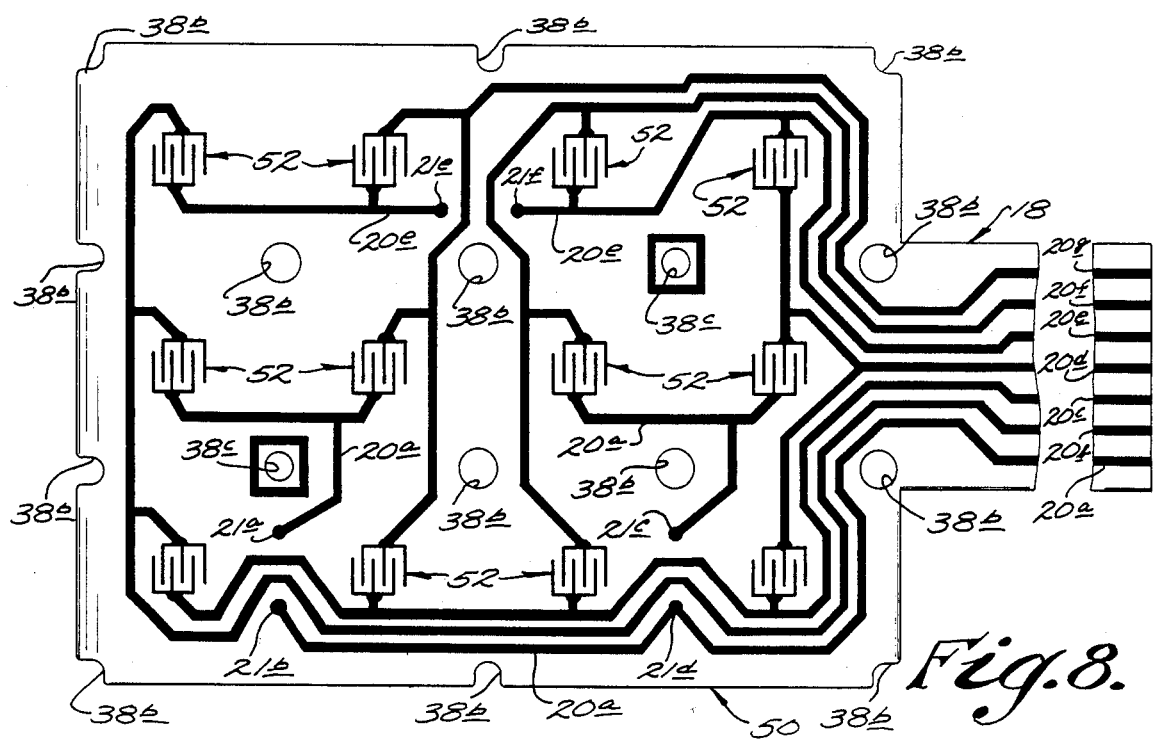
Fig. 8.

KEYBOARD SWITCH ASSEMBLY

BACKGROUND OF THE INVENTION

This invention relates generally to keyboard assemblies and more particularly to such assemblies having significant key travel and momentary type switches.

Keyboards of the type having snap acting, electrically conducting discs arranged to electrically connect two spaced conductors when a disc is actuated from one dished configuration to a second, oppositely dished configuration, are well known and in wide use. The spaced conductors may include staple like elements mounted on a printed circuit board with the discs maintained in selected locations relative to the staples by a disc retainer member, essentially a sheet of electrically insulative material having a plurality of disc receiving apertures formed therein. A keyboard of this, type is shown and described in U.S. Pat. No. 3,858,202.

In U.S. Pat. No. 4,005,293 the discs are formed in strips, the discs of a strip being electrically and physically connected to each other. The strip is attached to a wire conductor embedded in a plastic substrate with the discs adapted upon actuation to move into engagement with other wire conductors embedded in the substrate and extending parallel to the first referenced conductor.

Keyboards of this general type are very effective and reliable and provide a desirable tactile feedback characteristic, that is, when the discs snap from one configuration to an opposite configuration upon being depressed by a user the snap movement is felt by the user providing a positive indication of switch actuation. However, due to the nature of the switching mechanism the ultimate cycle life of the keyboard is not as high as is desirable for certain applications. That is, the disc is formed as a dish to set up inherent stresses to provide the snap motion thereby decreasing the ultimate life of the disc. Further, the cost of the keyboard, per switching station, is higher than desirable.

Another type of keyboard having very high cycle life has become conventional which comprises first and second sheets of electrically insulative material, such as polyester, on each of which are deposited electrical conductors and which are separated from one another by a spacer sheet of electrically insulative material. The spacer sheet is provided with apertures aligned with selected portions of the deposited electrical conductors so that depression of the top sheet at one of the selected locations will cause the selected portions on the first and second sheets to come into contact with each other. While this type of keyboard is very inexpensive as well as having a long life, it suffers from having very little travel, that is, essentially the thickness of the spacer, perhaps 0.004 or 0.005 inch. Further, there is no tactile feel for providing assurance that a keyswitch has been actuated.

To overcome this limitation bubbles have been formed in one of the polyester sheets to increase the travel before switch actuation and to provide some form of tactile feedback. The use of these bubbles however markedly decreases the cycle life of the switch, for example from millions of cycles to two or three hundred thousand cycles.

SUMMARY OF THE INVENTION

It is an object of the present invention to provide a keyboard which has a high cycle life, in the order of a million or millions of cycles while still having a low cost product.

Another object is the provision of keyboard apparatus which can easily be designed to provide different switch characteristics and layouts, such as amount of travel before actuation, amount of travel after switch actuation, amount of force required to achieve actuation, and the like.

Yet another object is the provision of a keyboard which is particularly conducive to interconnecting with other apparatus, such as telephones or the like, which are to be controlled through the keyboard.

Briefly, in accordance with the invention, an improved, low cost, membrane keyboard having tactile feedback, key travel type switches comprises a flexible membrane of electrically insulative material, such as a polyester film with electrically conductive runs deposited on a surface thereof. The runs include a plurality of switching stations having first and second interdigitated conductors spaced from one another. An escutcheon is provided with key receiving apertures and includes downwardly depending ribs extending in both X and Y directions, perpendicular to one another, and having a distal surface lying in a plane. The ribs surround each key station. A keypad formed of soft, flexible electrically insulative material having a plurality of domed shaped portions formed therein is received on the distal surface of the ribs. A conductive layer is formed on the bottom surface of each dome and a dome is aligned over each switching station. A plurality of posts depend downwardly from the ribs and extend through apertures formed in the keypad and a support plate received over the membrane. The support plate is pressed against the escutcheon through the keypad so that the keypad is compressed by the distal surface of the ribs particularly around the outer perimeter of the switching stations and then the posts are deformed to affix the parts together to provide an effective environmental seal. All the domes are interconnected by a pneumatic groove formed in the bottom of the keypad to provide an internal vent system. Key travel is limited by a plurality of stop surfaces formed in the keypad at each switching station. The membrane may be formed with a tail portion having conductive runs thereon extending beyond the escutcheon in order to provide a convenient interconnection means.

BRIEF DESCRIPTION OF THE DRAWINGS

These and other objects and embodiments of the present invention will be better understood from the following description of the invention taken in conjunction with the drawings wherein like reference numerals refer to like elements in the several Figures and in which:

FIG. 6 is a top plan view of a keypad used in the FIG. 1 assembly;

FIG. 7 is a side elevation of the FIG. 6 keypad;

FIG. 8 is a top plan view of a membrane used in the FIG. 1 assembly but rotated 90 degrees counterclockwise for ease of illustration;

DETAILED DESCRIPTION OF THE INVENTION

Figure 1:
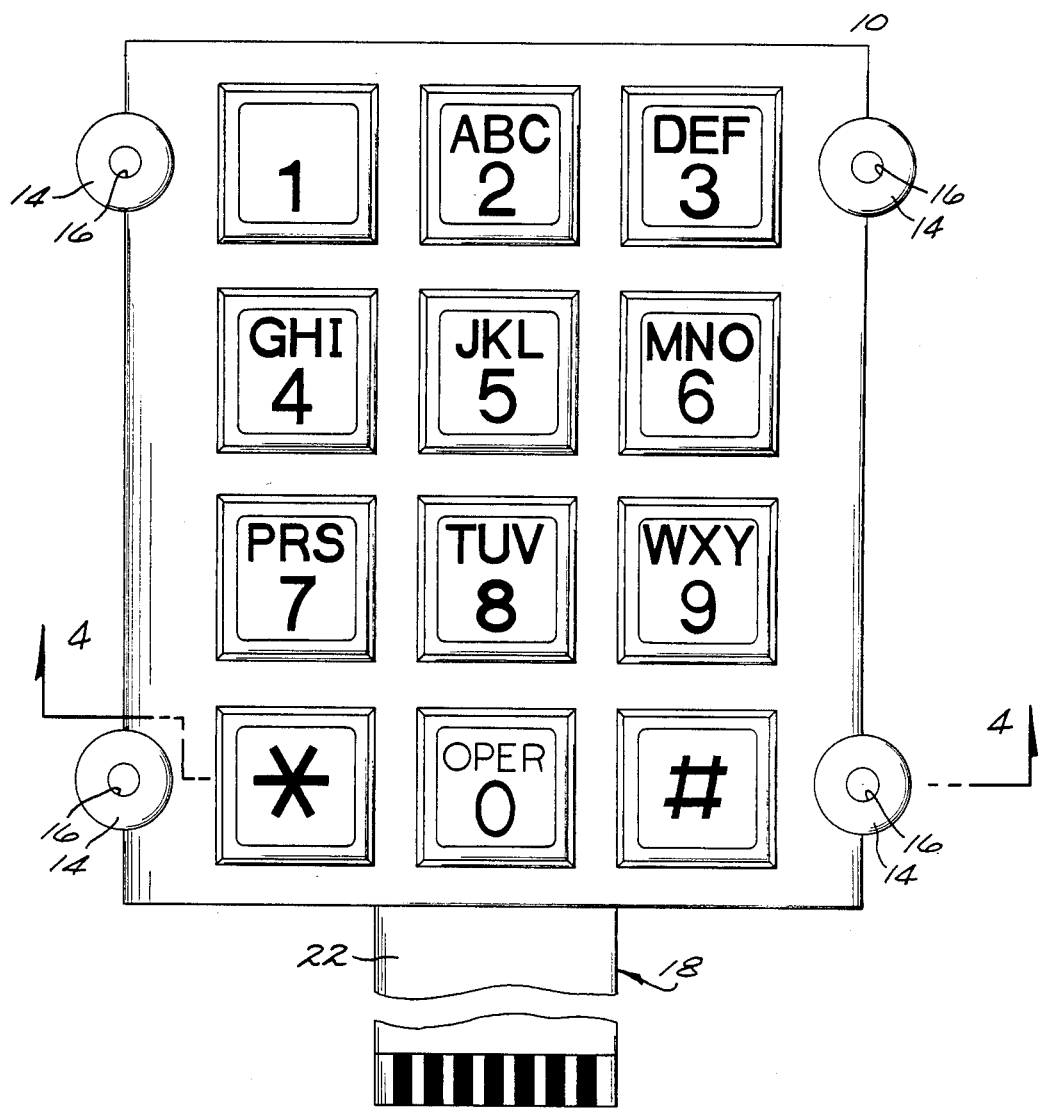
FIG. 1 is a top plan view of a keyboard assembly made in accordance with the invention.
Figure 2:
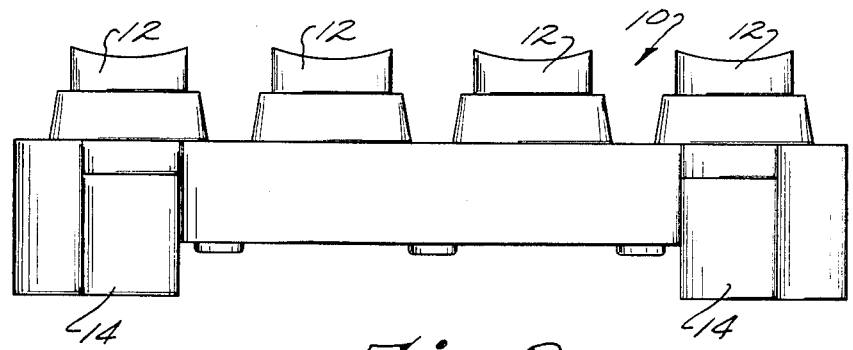
FIG. 2 is a side elevation of the FIG. 1 assembly.
Figure 3:
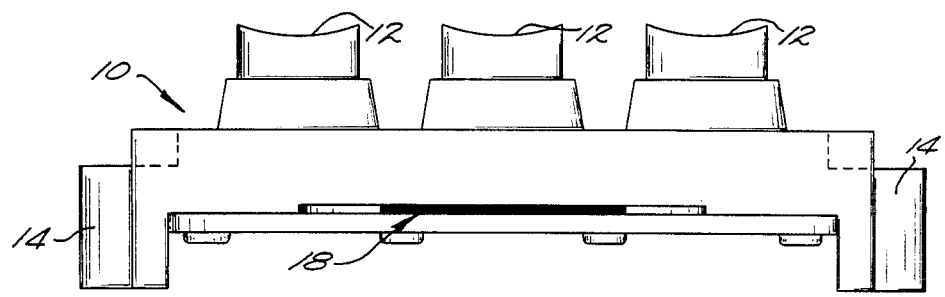
FIG. 3 is a front elevation of the FIG. 1 assembly.

As seen in FIGS. 1-3, keyboard assembly 10 is generally rectangular in configuration although other shapes can be employed as desired. A plurality of key members 12 are mounted on the assembly and are provided with selected alphanumerics. Ears 14, each having a bore 16, are integrally attached to assembly 10 to provide convenient means for attaching the assembly to a selected location. A tongue 18 projects outwardly from assembly 10 and provides convenient means for electrically interconnecting the keyboard assembly with apparatus to be controlled by the keyboard. Tongue 18 includes a substrate of electrically insulative material, to be discussed in more detail below, on which conductive runs 20a-20g are deposited and preferably covered, except at the distal free end of the tongue, with a suitable dielectric layer 22.

Figure 4:
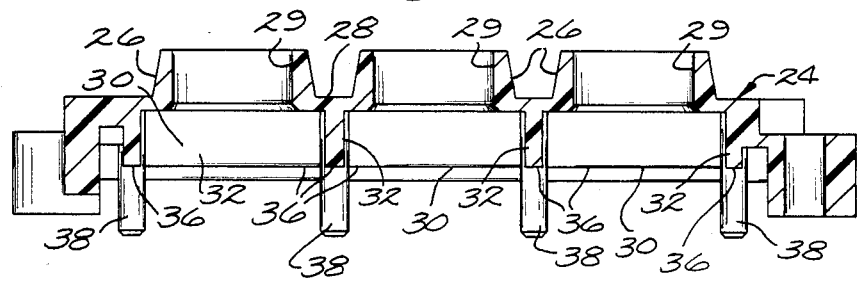
FIG. 4 is a cross sectional view taken on line 4—4 of FIG. 1 showing only the escutcheon and prior to being assembled.
Figure 5:
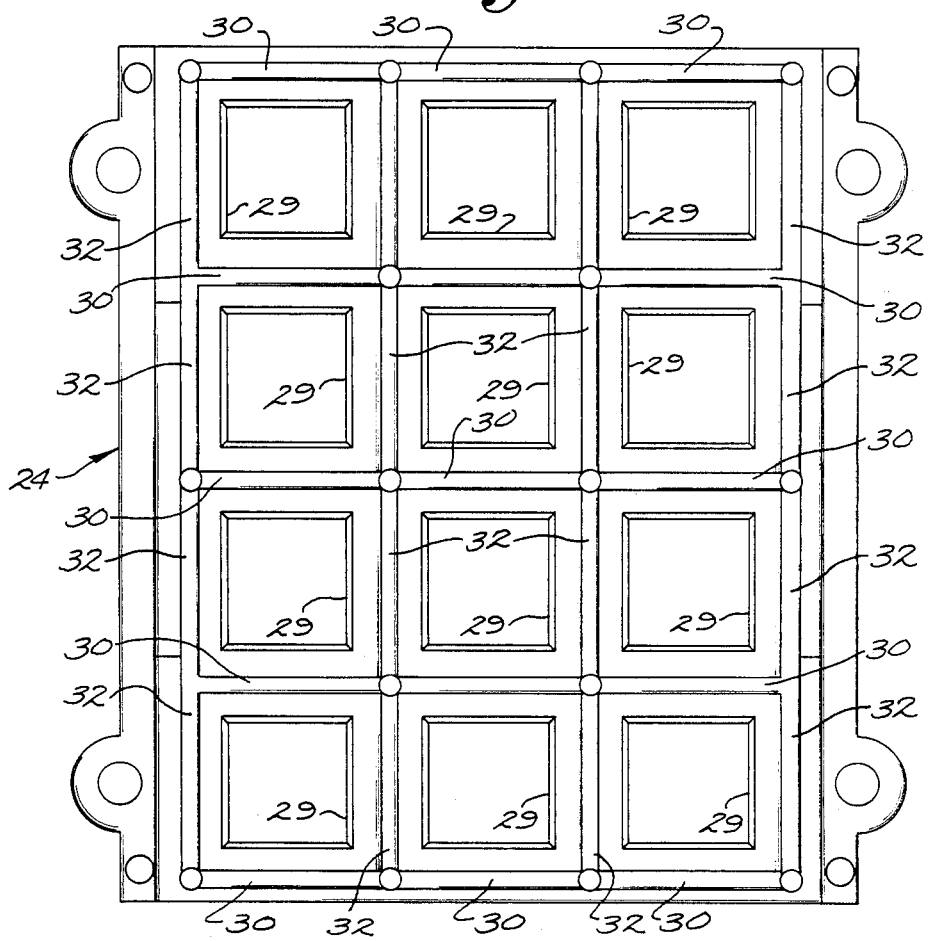
FIG. 5 is a bottom plan view of the FIG. 4 escutcheon.

With particular reference to FIGS. 4 and 5 the keyboard assembly includes an escutcheon 24 of suitable electrically insulative material such as ABS cycolac having a plurality of hub portions 26 on a top surface 28 thereof, each hub portion formed with a key receiving aperture 29. Depending downwardly from escutcheon 24 are ribs 30 extending in an X direction and ribs 32 extending in a Y direction, generally perpendicular to one another. Ribs 30 and 32 have a distal surface 36 lying in a plane surrounding each of the switch stations aligned with the key receiving apertures. Also extending downwardly from escutcheon 24 are a plurality of posts 38, to be discussed below in further detail.

Figure 9:
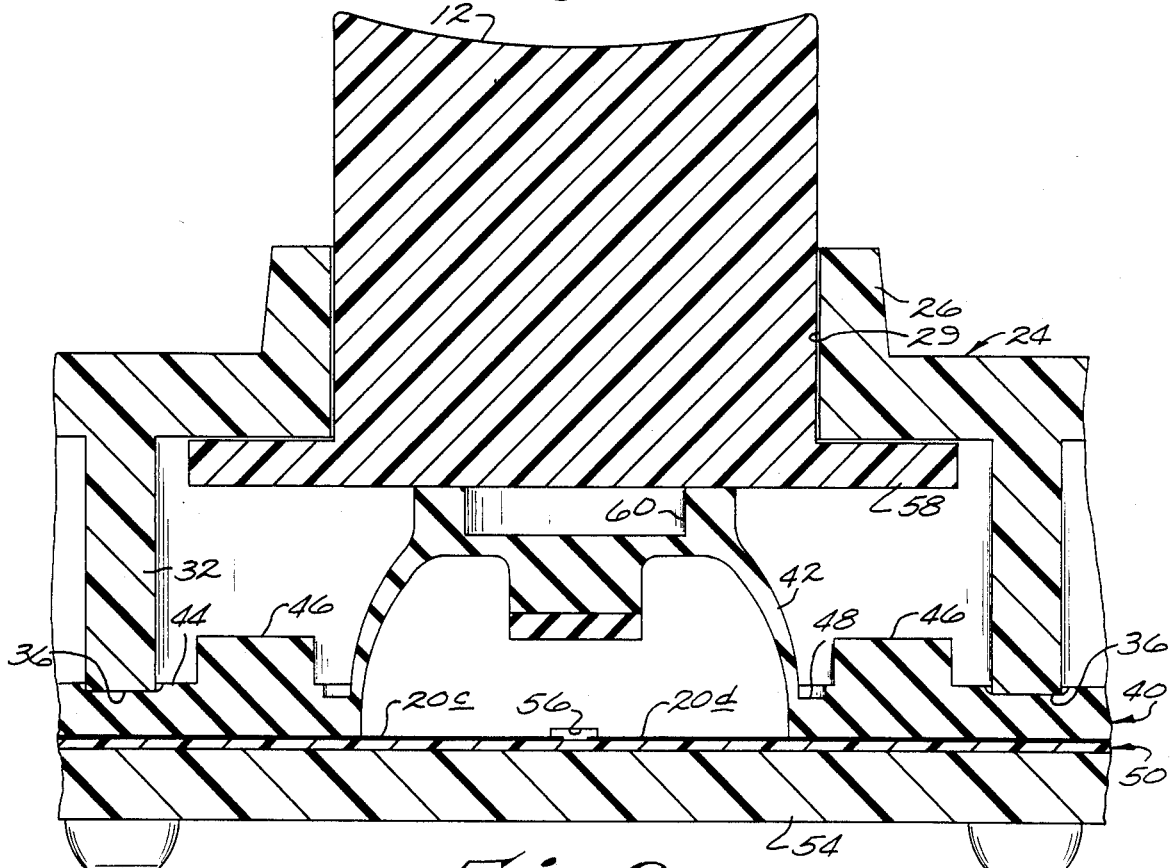
FIG. 9 is a cross sectional elevation through one of the switching stations.
Figure 10:
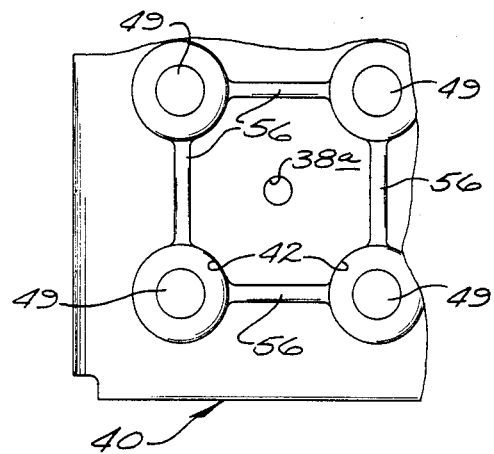
FIG. 10 is a bottom plan view of a portion of the FIGS. 6, 7 keypad.

As seen in FIGS. 6, 7 and 10, keypad 40 is formed of a sheet of soft, electrically insulative material, such as silicone rubber or a thermoplastic elastomer and is molded with a plurality of dome shaped portions 42 extending above a top surface 44. Spaced closely adjacent to and around the outer periphery of each dome shaped portion 42 are a plurality of stop surfaces 46 formed integrally with the keypad. Stop surfaces 46 help to prevent unnecessary and undue stressing of the keypad dome portion upon actuation. A groove 48 is preferably formed around the outer periphery of the dome portion to provide more space for the wall of the dome during buckling movement between the actuated or depressed position and the unactuated, at rest position. Post receiving apertures 38a are formed through the keypad sheet 40 spaced around the outer perimeter of the several dome portions and interspersed between dome portions. On the bottom surface of each dome is disposed a layer 49 of conductive material (FIG. 9). This may be, for instance, silicone rubber loaded with carbon particles.

Figure 8A:
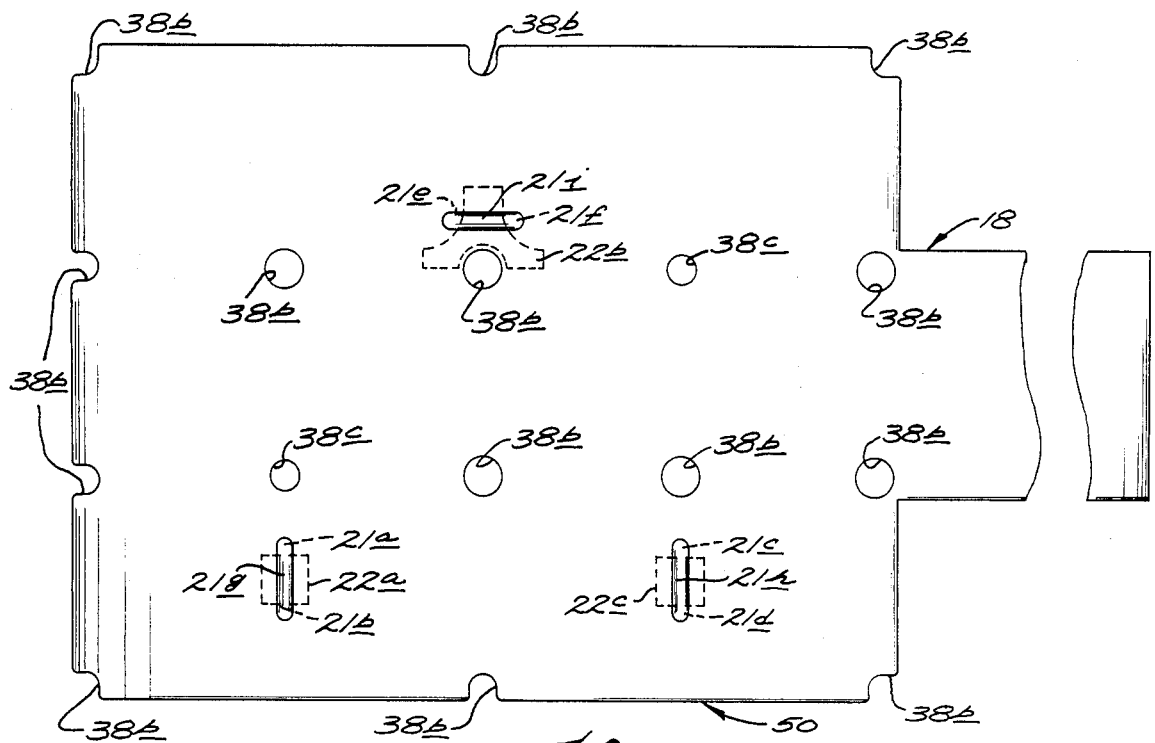
FIG. 8a is a top plan view of the FIG. 8 membrane partially completed.

As seen in FIG. 8, a flexible membrane 50 of suitable electrically insulative material, such as a 0.005 inch thick film of polyester is of the same general configuration as keypad 40 with the addition of tongue 18. A plurality of electrically conductive runs 20a through 20g are deposited on the top surface of membrane 50, by any suitable method, such as silk screening. The runs may be silver, carbon or other suitable electrically conductive material. A plurality of switching stations are formed by spaced interdigitated portions 52 of the conductive runs. Each of the runs extend to tongue 18 with point 21a linked to 21b point 21a to 21d (all in run 20a), and point 21e to 21f in run 20e. This is effected by first depositing the links 21g, 21h and 21i respectively, then placing a respective dielectric layer 22a, 22b and 22c of material betweem the points of each pair and then finally depositing the rest of the conductive pattern. Post receiving apertures 38b are provided through the membrane and alignable with post 38 in escutcheon 24. Two post receiving apertures 38c are slightly undersized to ensure the proper orientation and alignment of the conductive pattern.

The keyboard is assembled by inserting key members 12 in their respective key receiving apertures 29 of escutcheon 24, placing keypad 40 on surfaces 36 of ribs 30, 32 with posts 38 received through apertures 38a and with the convex shaped side of dome portion 42 facing the key members, then placing polyester membrane 50 with the conductor runs facing toward the keypad onto the assembly with posts 38 received in apertures 38b and 38c and then placing any suitable support plate 54, e.g. a resinous sheet, onto the assembly. Plate 54 is provided with post receiving apertures alignable with posts 38. As seen in FIG. 9 which shows a cross sectional view through a switching station, the support plate 54 is biased against the escutcheon so that surface 36 of ribs 30, 32 compresses the keypad sheet in order to provide an effective environmental seal. Posts 38 are staked in any suitable manner, e.g. depending on the material used for the escutcheon by heat or ultrasonically, as noted at 39 to effectively maintain the seal.

A pneumatic groove 56 is formed in the bottom surface of keypad 40 (see FIGS. 9 and 10) and joins all the dome portions 42 to each other to provide an internal venting system sealed from the outer atmosphere by means of the compression of the keypad around the outer perimeter of the switching stations to thereby obviate the possibility of external contaminants entering the switch chamber.

Key members 12 are formed with an outwardly extending flange portion 58 on their lower end, the top surface of which serves as a retainer for limiting outward travel of the key member and the lower surface of which for limiting downward travel of the key member in cooperation with stop surfaces 46 formed in keypad 40 projecting above top surface 44 thereof.

It will be observed from FIG. 9 that downward movement of key member 12 will bring conductive layer 49 into contact with interdigitated contact runs such as 20c and 20d to electrically connect them to each other. Due to the domed configuration the force required for actuation increases with travel until a point is reached where less force is required for continued travel as the dome buckles. This difference is felt by the user and is perceived as tactile feedback upon switch actuation. In the particular configuration shown in the Figure cut out portion 60 provides for overtravel. That is, the key can be depressed a selected distance after the conductor runs have been bridged. If overtravel is not desirable, then cut out portion 60 would not be provided. Total key travel, with or without overtravel, for keyboard assemblies of the type disclosed is generally in the order of 0.030 to 0.100 inch but can be as much as 0.150 inch.

In a keyboard assembly made in accordance with the invention actuation force required was 120 grams with 0.080 inch travel to switch closure at 90 grams and had 0.020 inch overtravel. Cycle life for this type of switch was in excess of one million cycles. The keypad had a sheet thickness of 0.048 inch with stop surface 46 disposed approximately 0.040 inch above surface 44. Channel 48 and groove 56 were both 0.010 inch deep. Keypad 40 was composed of silicone rubber and had a durometer between 40–45. Surfaces 36 compressed the keypad between approximately 0.002 and 0.003 inch. Conductive layer 49 was a carbon loaded silicone rubber cross linked to the bottom surface of the domes.

Membrane 50 was a polyester sheet 0.005 inch thick and conductive runs 20a–20g were deposited by screening using Amicon CT-5030-1A, a silver conductive material. The dielectric 22 and the layers placed over the links joining portions of the conductor runs was Amicon XT-5008, a heat curable epoxzy.

It will be understood that the top portions of the domes could be formed into integral key members if desired rather than have separate key members. The particular number of posts 38 placed within the outer periphery of the switching stations is a matter of choice, their main function being that of maintaining proper spacing of the several parts in the event of twisting or warping of support plate 54. Keyboards can be made in accordance with the invention having an actuation force selected between 0.5 and 7.0 ounces, tactile or linear response, key travel between 0.010 and 0.150 inch, life cycles between one and fifteen million cycles with any of a great variety of circuit configuration and interconnection profiles.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. Keyboard apparatus comprising:
    (a) a support plate,
    (b) a sheet of flexible dielectric material having a top and a bottom surface received on the support plate, the sheet having a pattern of conductive material disposed on the top surface, the pattern having a plurality of sets of first and second spaced interdigitated runs, the sheet provided with an interconnection tail portion extending beyond the support plate, conductive runs disposed on the tail portion of facilitate electrical connection to other electrical means,
    (c) a keypad sheet of flexible, soft, electrically insulative material having a top and a bottom surface and a plurality of domed shaped portions formed therein, the dome shaped portions having a top surface and a bottom surface, the sheet disposed on the top surface of the polyester sheet with a dome shaped portion disposed over each respective set of interdigitated runs, stop means formed in the keypad sheet adjacent each dome extending above the top surface of the keypad sheet,
    (d) a layer of conductive material disposed on the bottom surface of each dome shaped portion,
    (e) an escutcheon received over the sheets and on the support plate, the escutcheon formed with a key receiving aperture for each dome shaped portion and alignable therewith, and
    (f) a key received in each aperture and adapted to transfer motion to the top surface of the dome shaped portion causing the conductive layer to move toward its respective set of interdigitated runs until the conductive layer bridges the spaced runs of its respective set, the stop means adapted to limit downward travel of a respective key.

2. Apparatus according to claim 1 in which the keypad sheet is compressively attached to the polyester sheet to seal the interdigitated conductive runs and the layer of conductive material from the outer atmosphere.

3. Apparatus according to claim 1 in which the keypad sheet is composed of a silicone rubber material.

4. Apparatus according to claim 3 in which the pattern of conductive material comprises a silver impregnated material.

5. Apparatus according to claim 1 in which the keypad sheet is composed of a thermoplastic elastomer.

6. Apparatus according to claim 1 in which the escutcheon includes ribs having a distal surface lying in a plane and formed in an X and a Y direction perpendicular to one another with the ribs completely surrounding each aperture, the distal surface the ribs in engagement with the keypad sheet.

7. Apparatus according to claim 6 further including a plurality of posts depending from the ribs, and post receiving apertures are formed in the support plate and the keypad sheet, the posts extending through respective post receiving apertures in the support plate and the keypad sheet, the posts each having a free distal end which is deformed to fixedly attached the support plate to the escutcheon with the keypad sheet compressively deformed by the distal surface of the ribs to seal the interdigitated runs from the outer atmosphere.

8. Apparatus according to claim 1 in which a groove is formed in the bottom surface of the keypad sheet joining each domed shaped portion with each closest adjacent dome shaped portion.

9. Apparatus according to claim 1 in which stop means is formed in the keypad sheet adjacent each dome extending above the top surface of the keypad sheet to limit downward travel of a respective key.

10. Apparatus according to claim 9 in which the stop means comprises a plurality of projections spaced about the periphery of each dome.

11. Keyboard apparatus according to claim 1 in which the flexible dielectric is a film of polyester approximately 0.005 inch thick and the keypad sheet is between approximately 0.040 and 0.048 inch thick.

12. Keyboard apparatus according to claim 11 in which the escutcheon is formed with a rib having a distal surface extending around the perimeter of the plurality of sets of conductive runs, the distal surface compressing the keypad sheet between approximately 0.002 and 0.003 inch to seal the sets from the outer atmosphere.

13. Keyboard apparatus according to claim 11 in which a groove of approximately 0.010 inch depth is formed in the bottom surface of the keypad sheet joining the domed shaped portions to each other.

* * * * *

UNITED STATES PATENT AND TRADEMARK OFFICE
CERTIFICATE OF CORRECTION

PATENT NO. : 4,524,249
DATED : June 18, 1985
INVENTOR(S) : Charles F. Farrell

It is certified that error appears in the above—identified patent and that said Letters Patent is hereby corrected as shown below:

Claim 1, column 5, line 59, "polyester" should be - dielectric -

Claim 2, column 6, line 13, "polyester" should be - dielectric -

Claim 10, column 6, line 47, "claim 9" should be - claim 1 -

Signed and Sealed this

Fourth Day of February 1986

[SEAL]

Attest:

DONALD J. QUIGG

Attesting Officer

Commissioner of Patents and Trademarks